(12) United States Patent
Aberle et al.

(10) Patent No.: US 8,206,861 B2
(45) Date of Patent: Jun. 26, 2012

(54) INTERMEDIATE CIRCUIT WITH A FIRST SWITCH FOR SWITCHING A FUEL CELL STACK AND SECOND SWITCH FOR SHORT-CIRCUTING THE FUEL STACK, FUEL CELL SYSTEM WITH AN INTERMEDIATE CIRCUIT, AND METHOD FOR CONTROLLING THE INTERMEDIATE CIRCUIT

(75) Inventors: Markus Aberle, Dettingen (DE); Juergen Hoermann, Aitrach (DE)

(73) Assignee: Daimler AG, Stuttgart (DE)

( * ) Notice: Subject to any disclaimer, the term of this patent is extended or adjusted under 35 U.S.C. 154(b) by 642 days.

(21) Appl. No.: 12/303,350

(22) PCT Filed: Jun. 3, 2006

(86) PCT No.: PCT/EP2006/005336
§ 371 (c)(1), (2), (4) Date: May 5, 2009

(87) PCT Pub. No.: WO2007/140798
PCT Pub. Date: Dec. 13, 2007

(65) Prior Publication Data
US 2009/0325003 A1 Dec. 31, 2009

(51) Int. Cl.
| H01M 8/04 | (2006.01) |
| H01H 19/64 | (2006.01) |
| H01H 31/10 | (2006.01) |
| H01H 33/52 | (2006.01) |
| H01H 47/00 | (2006.01) |
| H01H 85/46 | (2006.01) |
| H01H 35/00 | (2006.01) |
| H01H 83/00 | (2006.01) |
| H01H 33/59 | (2006.01) |
| H01J 7/00 | (2006.01) |

(52) U.S. Cl. ........ 429/431; 429/428; 429/429; 429/430; 429/432; 307/113; 307/116; 307/125

(58) Field of Classification Search .................. 429/431, 429/428, 429, 430, 432; 307/113, 116, 125
See application file for complete search history.

(56) References Cited

U.S. PATENT DOCUMENTS 5,780,980 A 7/1998 Naito
(Continued)

FOREIGN PATENT DOCUMENTS

DE 199 54 306 A1 7/2001
(Continued)

OTHER PUBLICATIONS

International Search Report dated Feb. 19, 2007 including English translation of the relevant portion (Seven (7) pages).
(Continued)

*Primary Examiner* — Basia Ridley
*Assistant Examiner* — Sean P Cullen
(74) *Attorney, Agent, or Firm* — Crowell & Moring LLP

(57) ABSTRACT

An intermediate circuit for controlling the connection of a fuel cell stack to a load bus includes three switching elements arranged in a pi configuration. At least one such switching element is provided for short circuiting either or both of the fuel cell stack and the load bus, while a further switching element controllably interrupts the line connection between the fuel cell stack and the load bus. The respective switches are driven according to a control method that accommodates start-up operation, switch-off operation, emergency shut down, and a self diagnostic mode.

8 Claims, 2 Drawing Sheets

U.S. PATENT DOCUMENTS

| | | |
|---|---|---|
| 6,777,909 B1 | 8/2004 | Aberle et al. |
| 2001/0051291 A1 | 12/2001 | Aoyagi et al. |
| 2003/0198845 A1 | 10/2003 | Nakanishi et al. |
| 2004/0247964 A1* | 12/2004 | Sadamoto et al. .............. 429/23 |

FOREIGN PATENT DOCUMENTS

| | | | |
|---|---|---|---|
| EP | 1 375 239 | A2 | 1/2004 |

OTHER PUBLICATIONS

PCT/ISA/237 including English translation of the relevant portion (Seven (7) pages), Mar. 12, 2008.

* cited by examiner

INTERMEDIATE CIRCUIT WITH A FIRST SWITCH FOR SWITCHING A FUEL CELL STACK AND SECOND SWITCH FOR SHORT-CIRCUTING THE FUEL STACK, FUEL CELL SYSTEM WITH AN INTERMEDIATE CIRCUIT, AND METHOD FOR CONTROLLING THE INTERMEDIATE CIRCUIT

This application is a national stage of PCT Application No. PCT/EP2006/005336, filed Jun. 3, 2006, the entire disclosure of which is herein expressly incorporated by reference.

BACKGROUND AND SUMMARY OF THE INVENTION

The invention relates to an intermediate circuit for connecting a fuel cell stack to a load bus, a fuel cell system having the intermediate circuit, and a method for controlling the intermediate circuit.

Fuel cell stacks are an innovative, environmentally friendly alternative to energy generation, and as an energy source for vehicle propulsion systems, have the potential for at least partially replacing internal combustion engines, which have been customary in the past.

However, for operation of fuel cell stacks in vehicles consideration must be given to the constraints of this technology. In particular for starting up and switching off the fuel cell stack, it is necessary to disconnect the fuel cell stack from the load, since the fuel cell stack is able to produce only a reduced amount of power in these operating modes. For these reasons it is customary to disconnect the fuel cell stack from the load in specific operating modes, using a switching element.

For example, German patent document DE 199 54 306 A1 discloses a device for generating electrical power using a fuel cell in a vehicle, in which the fuel cell and drive motor are separably connected using a mechanical ground contact.

European patent document EP 1 375 239 A2 proposes a method and a device for controlling a fuel cell system. For supplying the load consumers, a fuel cell stack is connected to multiple load consumers in such a way that the supply may be interrupted by a switching element. According to the description, the switching element is designed as a MOSFET or IGBT.

One object of the present invention is to provide an intermediate circuit for connecting a fuel cell stack to a load bus, a fuel cell system, and a method for controlling the intermediate circuit, so that a fuel cell stack may be switched on and off on a load bus, with particular consideration for safety requirements in order to increase the operational reliability.

The fuel cell stack may have any given design, and in particular for use in a vehicle preferably has fuel cells of the PEM design. The fuel cell stack includes two supply outputs, between which a supply voltage $U_{stack}$ is applied during operation.

Associated with the load bus are two load inputs, to which a load bus voltage $U_{HV}$ is applied during operation. Loads may be connected to the load bus, in particular a drive motor for a vehicle or other components such as heaters, lights, etc. The load bus is preferably connected to additional energy storage elements, for example an automobile battery or a SuperCap, optionally with the connection of a DC/DC converter in between. The operating voltage $U_{stack}$ and/or load bus voltage $U_{HV}$ is/are provided as direct-current voltage, preferably with a voltage of approximately 12 V or 42 V, respectively.

The intermediate circuit according to the invention has a first electronic switching element which is connected between the fuel cell stack and the load bus such that the fuel cell stack may be switched on or off on the load bus. For this purpose an electrical connecting line is preferably switched through or blocked between one of the supply outputs and one of the load inputs. In alternative embodiments two electrical connecting lines, each connected between one of the supply outputs and one of the load inputs, is switched through or blocked.

According to the invention, at least one additional electronic switching element is provided in the intermediate circuit, so that in particular when the first switching element is closed, the fuel cell stack and/or the load bus may be short-circuited, whereby in such a short circuit the supply outputs are interconnected and/or the load inputs are interconnected, in particular connected with low-resistance conduction.

The invention is directed to the consideration that by using such an additional electronic switching element, safety functions in the intermediate circuit may be implemented effectively and economically.

In one preferred embodiment, the at least one additional electronic switching element includes a second electronic switching element or is designed as a second electronic switching element. The second electronic switching element is provided in the intermediate circuit in such a way that when the first switching element is opened the second switching element is able to short-circuit the fuel cell stack, in particular the supply outputs. As explained in detail below, measurement functions and thus monitoring and safety functions may be implemented using the second switching element. The second switching element also allows improved "heating up" of the fuel cell stack in the start-up phase.

In a further preferred embodiment, the at least one additional electronic switching element includes a third electronic switching element or is designed as a third electronic switching element. The third switching element is provided in such a way that when the first switching element of the load bus is open, the load bus, in particular the load inputs, may be short-circuited. The advantage of the third switching element is that the load bus may be rapidly discharged in the event of a hazard or for service, resulting in a safe state. The short circuit in particular ensures that the remaining load bus voltage is a safe low voltage, for example, less than 60 V.

One, several, or all of the electronic switching elements is/are preferably implemented as a semiconductor component, in particular as a transistor, IGBT (insulated gate bipolar transistor), or MOSFET. The use of electronic instead of mechanical switching elements for switching the intermediate circuit has the advantage that installation space and costs may be conserved while at the same time realizing higher reliability and longer service lives of the switching elements. Solely for the sake of completeness, it is noted that the terms such as "opening" or "closing" of the switching element are preferably equivalent to low-resistance switching or high-resistance switching, respectively, of the switching element.

In one particularly preferred embodiment, the first, second, and third switching elements are connected to one another in a PI configuration. The term "PI configuration" refers to a system based on the Greek letter pi. In the present context, the PI configuration is preferably implemented in such a way that the first switching element is connected in series between a first supply output and a first load input. On the fuel cell stack side, the input of the first switching element may be connected in an electrically conductive manner to a connecting line between the second supply output and the second load input via the second switching element. On the load bus side, the output of the first switching element may be connected in an electrically conductive manner to the same connecting line. Due to the parallel connection of the second and third switching elements the PI configuration has a redundant design; the redundancy may be further improved by connecting additional switching elements in parallel. The additional switching elements are connected either analogously to the second switching element or analogously to the third switching element.

In one particularly advantageous embodiment, the first switching element is designed and/or connected for disconnecting the fuel cell stack and load bus without reverse current flow. The first switching element preferably has a valve effect, and allows the current to flow from the fuel cell stack only in the direction of the load bus. In this manner reverse current flow is prevented as a result of the power converter function of the first switching element. This design allows the intermediate circuit to operate at a load bus voltage $U_{HV}$ which in particular has a higher value than the supply voltage $U_{stack}$, since current flow from the load bus is prevented in the direction of the fuel cell stack. The described operating mode is present, for example, in the start-up process or when the fuel cell stack is switched off. Another application is for the case in which the fuel cell stack is to be short-circuited while the supply bus still has voltage applied.

In one particularly simple and effective optional embodiment, the first switching element is provided only singly in the intermediate circuit, thereby minimizing the ohmic loss during operation as a result of the number of switching elements.

One advantageous embodiment of the intermediate circuit includes a first control device (a driver device) for the second switching element, while the first control device is designed for clocked (pulse width modulated) control of the second switching element. This design allows, for example, clocked short circuiting of the fuel cell stack in order to operate the fuel cell stack under load or to discharge same. This type of loading of the fuel cell stack may be advantageously used in particular in the start-up process, or also when idling after start-up.

In a further advantageous embodiment, a second control device (a driver device) is provided which controls the third switching element. The second control device is designed and/or connected in such a way that in the event of malfunction (in particular, a voltage drop in the load bus), the third switching element is automatically or independently closed and the load bus is short-circuited.

The invention further relates to a fuel cell system which includes the fuel cell stack, the load bus, and the described and claimed intermediate circuit. In this regard it is disclosed that the intermediate circuit is also suitable for the connection of other electrical energy storage elements or energy converters. As energy storage elements or energy converters, circuits may be used in particular with fuel cells, and/or double-layer capacitors, and/or batteries, and/or electrical machines (motors/generators), and/or solar cells.

The invention further relates to a method for operating the described intermediate circuit or fuel cell system, which optionally includes one or more of the following operating modes in any given selection and combination: start-up process, switch-off process, first emergency shutdown mode, second emergency shutdown mode, and/or self-diagnostic mode.

Particularly advantageous are embodiments in which the second switching element is controlled in a clocked manner by clocked short-circuiting of the fuel cell stack, in particular the supply outputs, in order to discharge the fuel cell stack or control the discharge current. Such discharge or control is preferably carried out during a start-up process for the fuel cell stack while the first switching element is still open. The fuel cell stack is placed under load as a result of the clocked operation, while at the same time the current flowing through the second switching element is limited and controlled by the clock ratio. Clocked operation of the second switching element may also be advantageously used after the start-up process in order to place the fuel cell stack under load. The clocked operation is preferably carried out by pulse width modulation of the control signal sent from the control device to the second switching element, thereby subjecting the control signal to pulse width modulation (PWM).

The described invention may be used in any fuel cell system to disconnect the fuel cell stack from the load bus (HV bus). In addition, for opening the intermediate circuit the load bus is short-circuited, thus limiting the load bus voltage to a safe level and meeting the applicable safety requirements. The use of electronic instead of mechanical switching elements allows more flexible control in addition to the other advantages.

Other objects, advantages and novel features of the present invention will become apparent from the following detailed description of the invention when considered in conjunction with the accompanying drawings.

DETAILED DESCRIPTION OF THE DRAWINGS

Figure 1:
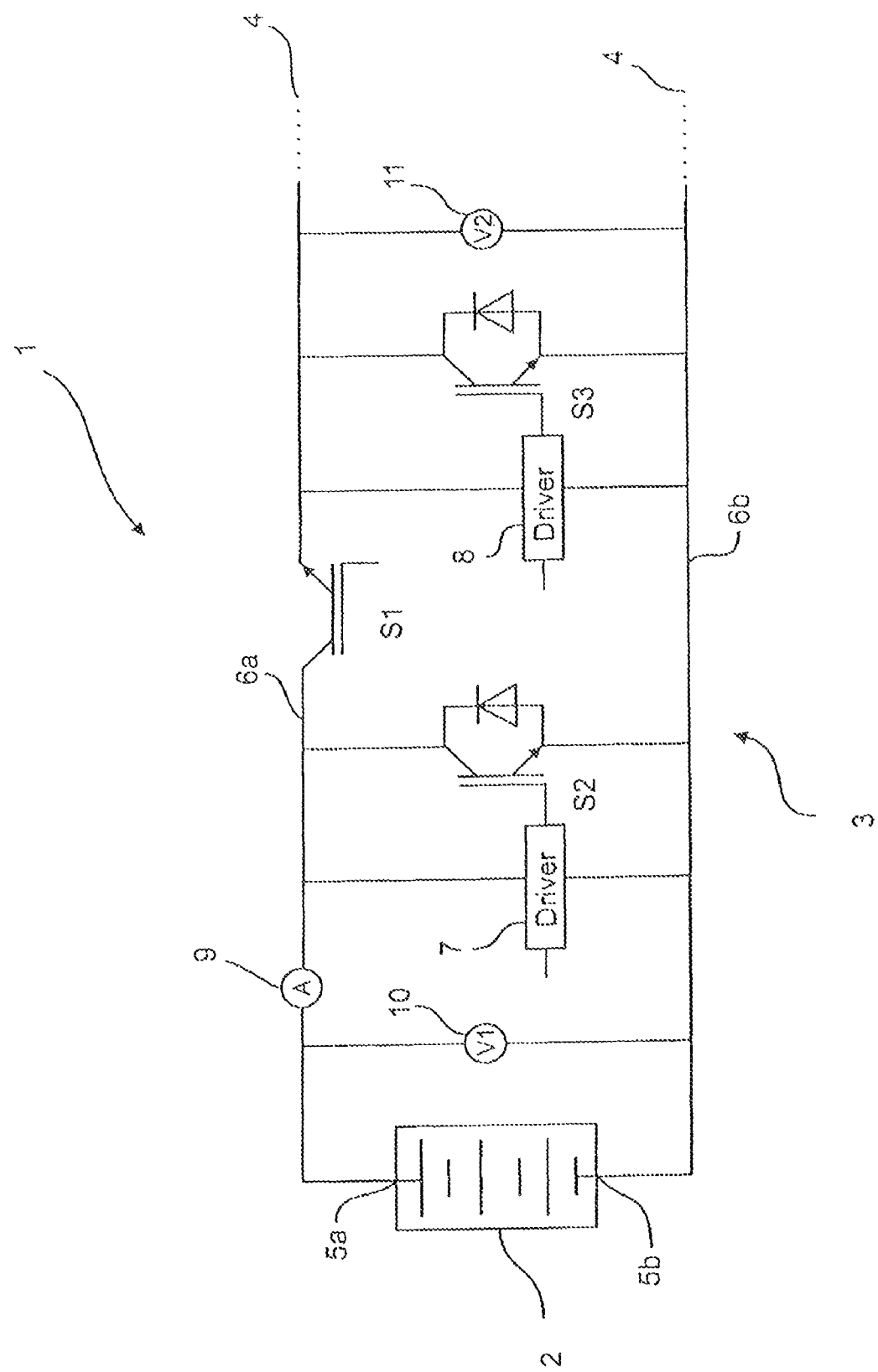
FIG. 1 is a schematic circuit diagram of a first exemplary embodiment of an intermediate circuit according to the invention.

Identical or corresponding parts, dimensions, or elements are provided with the same reference numerals in the figures.

FIG. 1 is a schematic circuit diagram of a fuel cell system 1, having a fuel cell stack 2 which is connected or wired to a load bus 4 via an intermediate circuit 3. For example, the fuel cell system 1 may be integrated into a vehicle (not illustrated), such that the load bus 4 provides power to a drive motor (not illustrated).

The fuel cell stack 2 has multiple fuel cells which are implemented in a PEM design, for example. For connection to the intermediate circuit 3, the fuel cell stack 2 has two supply outputs 5a, b, in the present case a positive terminal 5a and a negative terminal 5b, to which a supply voltage $U_{stack}$ (V1) is applied.

Starting at the first supply output 5a (positive terminal), a first connecting line 6a leads to the load bus 4 via a first switching element S1. From the second supply output 5b (negative terminal) a second connecting line 6b likewise leads to the load bus 4, without connection of additional functional elements in between.

Starting from the fuel cell stack 2 directly upstream from the first switching element S1, a bypass line branches from the first connecting line 6a and leads to the second connecting line 6b via a second switching element S2. Likewise starting from the fuel cell stack 2, an additional bypass line branches, downstream from the first switching element S1, from the first connecting line 6a and leads to the second connecting line 6b via a third switching element S3. In the illustration in FIG. 1, the three switching elements S1, S2, and S3 are configured and connected in the configuration of the Greek letter pi.

The three switching elements S1, S2, and S3 are each designed as electronic switching elements, specifically, using IGBTs (insulated gate bipolar transistors). Such switching elements require only a small installation space, and at the same time are economical to use. The switching elements are also characterized by higher reliability and longer service lives compared to mechanical switching elements, and may be controlled in a flexible manner, in particular using clocked operation or pulse width modulation.

Each of the switching elements S2 and S3 has a freewheeling diode connected in parallel to the IGBT, whereas the switching element S1 has no such freewheeling diode. The reverse current flow is limited solely by the IGBT, for the switching element S1. Due to its implementation as an IGBT the switching element S1 has a valve effect, and allows the current to flow from the fuel cell stack 2 only in the direction of the load bus 4, thereby preventing reverse flow. This design allows, for example, a load bus voltage $U_{HV}$ (V2) which is higher than the supply voltage $U_{stack}$ of the fuel cell stack 2 without reverse flow of the current. This operating mode occurs, for example, during the start-up or switch-off process, or when the fuel cell stack 2 is short-circuited, for example in an emergency, while the load bus 4 still has voltage applied.

The switching element S2 is controlled by a gate driver 7 which allows pulse width modulated control of the switching element S2. As described further below, this operating mode is advantageously used, for example, during preheating of the fuel cell stack 2 in order to operate the fuel cell stack 2 under load. Short circuit-proof lines are preferably used between the fuel cell stack 2 and the switching element S2.

The switching element S3 is controlled by a gate driver 8 which is connected in such a way that, if the load bus voltage $U_{HV}$ in the load bus 4 drops below a threshold value, or in the event of malfunction or emergency, the bus 4 is automatically or independently short-circuited (i.e., switched using a low-resistance connection) by the third switching element S3.

As shown in the circuit diagram, a short circuit may occur between the first connecting line 6a and the second connecting line 6b, using the second switching element S2 or also the third switching element S3. This redundant design increases the operational reliability of the intermediate circuit 3. In alternative embodiments, additional electronic switching elements may also be provided for short-circuiting to further increase the operational reliability.

For monitoring purposes, in the portion of the intermediate circuit 3 on the fuel cell stack side a current measuring device 9 is provided in the first connecting line 6a, and a voltage measuring device 10 is connected parallel to the fuel cell stack 2 for measuring the supply voltage $U_{stack}$. In the portion of the intermediate circuit 3 on the load bus side, an additional voltage measuring device 11 is provided for measuring the load bus voltage $U_{HV}$.

The fuel cell system 1 may be operated in various operating modes, the pertinent aspects of which are described below:

Start-Up Process:

During the start-up process for the fuel cell system 1 (i.e., during preheating), the switching element S1 and the switching element S3 are open or opened, and the load bus 4 is charged using a DC/DC converter (not illustrated). The power supply for the charging may be provided, for example, by an automobile battery or a capacitor (SuperCap). As stated above, the power converter function of the first switching element S1 ensures that even when $U_{HV} > U_{stack}$ no reverse current flows from the load bus 4 to the fuel cell stack 2. The switching element S2 is then controlled in a clocked manner by pulse width modulation, so that the switching element S2 is switched in a clocked, low-resistance manner. Starting at this state, the fuel cell stack 2 is supplied with fuel (such as hydrogen), and an oxidizing agent (air or oxygen). The current flowing through the switching element S2 is limited by the pulse-pause ratio of the switching element S2 (PWM), and is constantly adapted to the instantaneous power capacity of the fuel cell stack 2. After the fuel cell stack 2 is sufficiently heated and ready for operation, the load bus voltage $U_{HV}$ in the load bus 4 is adapted to the supply voltage $U_{stack}$ of the fuel cell stack 2 (or vice versa), and the switching element S2 is closed. In this manner the start-up process is concluded.

After the start-up process, the switching element S2 may be further clocked (PWM) to place additional load on the fuel cell stack 2.

Switch-Off Process:

The switch-off process involves shutting down the fuel cell system 1, and follows a steady state or quasi-steady state continuous operation of the fuel cell system 1 during which the switching element S1 is closed and the switching elements S2 and S3 are open. To switch off the fuel cell system 1, first the load current for the load consumers of the load bus 4 is reduced to idle operation. The supply to the fuel cell stack 2, in particular the feed of fuel and oxidizing agent, is then shut off. After the supply is terminated the load bus 4 is still able to draw current from the fuel cell stack 2 until the supply voltage $U_{stack}$ has dropped below a defined threshold value. No later than immediately after the voltage has fallen below this threshold value, the switching element S1 is opened. When the supply voltage $U_{stack}$ for the gate driver 8 is switched off by opening the switching element S1, the gate driver 8 automatically and independently controls the switching element S3, thereby closing the switching element S3. As a result, the load bus 4 is short-circuited with low resistance, thereby reducing the load bus voltage $U_{HV}$ to a safe, low-voltage value (in particular, less than 60 V). After the switch-off process the switching elements S1 and S2 are open and the switching element S3 is closed.

First Emergency Shutdown:

The first emergency shutdown is initiated by, for example, opening a plug-in connector in the load bus 4. In response, the supply to the fuel cell stack 2 is shut off and the switching element S1 is opened so that no supply voltage $U_{stack}$ is present on the load bus 4. In a next step the switching element S3 is closed, thereby very quickly reducing the load bus voltage $U_{HV}$ to safe values. The fuel cell stack 2 is likewise rapidly discharged by clocked closing (PWM) of the second switching element, the discharge current preferably being controlled using the current measuring device 9.

Second Emergency Shutdown:

The second emergency shutdown is initiated by overload current, in particular short-circuit current, which is detected by the current measuring device 9, for example. In response, the supply to the fuel cell stack 2 is shut off and the switching element S2 is closed in order to divert the short circuit and thus relieve the switching element S1 of load. In a further step the switching element S1 is opened to interrupt the electric circuit.

Self-Diagnosis:

The illustrated architecture of the fuel cell system 1 also allows various diagnostic operating modes. Starting from continuous operation, during which the switching element S1 is closed and the switching elements S2 and S3 are open, briefly opening the switching element S1, for example, allows independent measurement of the supply voltage $U_{stack}$ and the load bus voltage $U_{HV}$. Briefly closing the switching element S2 allows the current measuring device 9 to make a qualitative or quantitative current measurement, in particular a maximum current measurement. After the switching element S2 is closed, the current must sharply rise and then fall as soon as the switching element S2 is reopened. In addition, the current measuring device 9 allows a diagnosis during the clocked operation (PWM) of the switching element S2, in particular monitoring of the maximum current. Briefly closing the switching element S3 allows a qualitative check of the load bus voltage $U_{HV}$, since the load bus voltage $U_{HV}$ must first be sharply reduced, and after the switching element S3 is opened must rise again. The term "briefly" is preferably understood to mean a period of less than 2 seconds, preferably less than 1 second, in particular less than 0.1 second.

In summary, the switching element S1 is used to interrupt the intermediate circuit, whereby, for example, an electric arc is prevented when the plug-in connector is pulled out in the region of the load bus 4. The switching element S1 is designed as a transistor, preferably without an internal freewheeling diode, so that, for example, during the start-up process the load bus voltage $U_{HV}$ may also be greater than the supply voltage $U_{stack}$, and reverse current is prevented as a result of the power converter function of the switching element S1. On the other hand, the switching element S2 is able to short-circuit the fuel cell stack 2, and use may be made of this function during heating (preheating) of the fuel cell stack 2 or in the event of malfunction, for example. The switching element S3 is able to short-circuit and thus discharge the load bus 4, thereby quickly establishing a safe state. The redundancy provided by the parallel connection of the switching elements S2 and S3 increases the operational reliability. Optionally such redundancy may be further improved using additional parallel connections of electronic switching elements.

Figure 2:
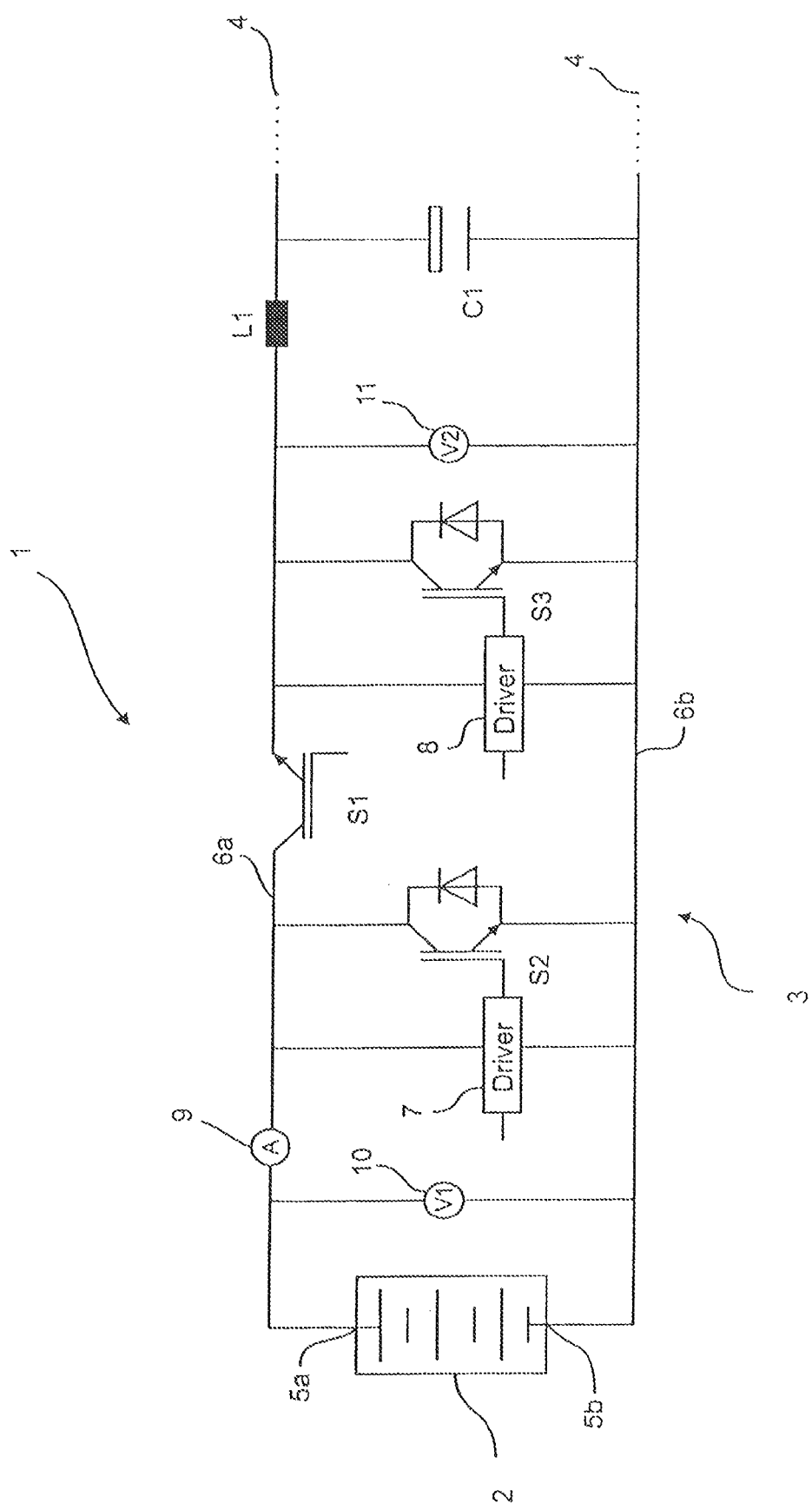
FIG. 2 shows a modification of the first exemplary embodiment as a second exemplary embodiment, in the same representation.

FIG. 2 shows a second embodiment which represents a refinement of the fuel cell system 1 in FIG. 1. In contrast to FIG. 1, in FIG. 2 a filter device L1-C1 is provided in the region of the load bus 4 which is designed to filter or reduce voltage ripples produced by the clocked operation of the switching element S2 (PWM). In the exemplary embodiment the filter device L1-C1 is formed by a combination of an inductive resistor L1 and a capacitor C1; alternatively, any filter device is possible which fulfills the same objective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. An intermediate circuit for connecting a fuel cell stack to a load bus, said intermediate circuit comprising:
    a first switching means connected between the fuel cell stack and the load bus, for switching the fuel cell stack on or off on the load bus;
    at least one additional switching means for short-circuiting one of the fuel cell stack and the load bus; and
    control means for controlling the at least one additional switching means to short-circuit said one of the fuel cell stack and the load bus in the event of malfunction,
    wherein said first and at least one additional switching means comprises switching elements,
    wherein said control means controls the at least one additional switching means in a clocked manner by pulse width modulation, whereby current that flows through said at least one additional switching means is limited by a pulse-pause ratio of the at least one additional switching means.

2. An intermediate circuit for connecting a fuel cell stack to a load bus, said intermediate circuit comprising:
    a first electronic switch connected in series between an output of said fuel cell stack and an input of said load bus; and
    means for limiting current flowing from said fuel cell stack when said first electronic switch is open;
    wherein said means for limiting current comprises i) a second electronic switch connected in parallel with said fuel cell stack, and ii) a control means for generating a pulse width modulated signal that causes said second electronic switch to be clocked on and off with a pulse-pause ratio that is adapted to an instantaneous power output capacity of the fuel cell stack.

3. An intermediate circuit for connecting a fuel cell stack to a load bus, said intermediate circuit comprising:
    a first electronic switching element which is connected between the fuel cell stack and the load bus for switching the fuel cell stack on or off on the load bus;
    at least one additional electronic switching element connected for short-circuiting the fuel cell stack and/or the load bus, wherein the at least one additional electronic switching element includes a second electronic switching element which is connected for short-circuiting the fuel cell stack when the first switching element is open and a third electronic switching element which is connected for short-circuiting the load bus when the first switching element is open;
    a control device for the third electronic switching element, said control device being configured such that in the event of malfunction the third electronic switching element is closed; and
    a further control device for controlling the second electronic switching element, said further control device being configured such that the second electronic switching element may be controlled by one of a clocked manner, and pulse width modulation.

4. The intermediate circuit according to claim 3, wherein the first, second, and third switching elements are connected in a PI configuration.

5. The intermediate circuit according to claim 3, wherein the at least one additional electronic switching element includes multiple redundantly connected switching elements.

6. The intermediate circuit according to claim 3, wherein the first switching element is configured to disconnect the fuel cell stack and load bus, without reverse current flow.

7. The intermediate circuit according to claim 3, wherein the first switching element is provided only singly in the intermediate circuit.

8. A fuel cell system comprising:
    a fuel cell stack;
    a load bus; and
    an intermediate circuit according to claim 3.

* * * * *